(12) United States Patent
Blanc et al.

(10) Patent No.: US 8,378,247 B2
(45) Date of Patent: Feb. 19, 2013

(54) COMPOSITE WIRE FOR ELECTRICAL DISCHARGE MACHINING

(75) Inventors: Patrick Blanc, Metz Tessy (FR); Michel Ly, Annecy (FR); Gerald Sanchez, Annecy (FR)

(73) Assignee: Thermocompact, Metz Tessy (FR)

( * ) Notice: Subject to any disclaimer, the term of this patent is extended or adjusted under 35 U.S.C. 154(b) by 1312 days.

(21) Appl. No.: 11/816,070

(22) PCT Filed: Feb. 10, 2006

(86) PCT No.: PCT/FR2006/000304
§ 371 (c)(1),
(2), (4) Date: Aug. 10, 2007

(87) PCT Pub. No.: WO2006/085006
PCT Pub. Date: Aug. 17, 2006

(65) Prior Publication Data
US 2008/0061038 A1      Mar. 13, 2008

(30) Foreign Application Priority Data

Feb. 11, 2005   (FR) ...................... 05 01547
Aug. 17, 2005   (FR) ...................... 05 08589

(51) Int. Cl.
*B23H 7/08* (2006.01)
(52) U.S. Cl. .................................. 219/69.12
(58) Field of Classification Search ............... 219/69.12, 219/69.15, 69.11, 69.17; 420/477, 521; 428/674, 428/677
See application file for complete search history.

(56) References Cited

U.S. PATENT DOCUMENTS

| | | | | |
|---|---|---|---|---|
| 4,287,404 A * | 9/1981 | Convers et al. | ............. | 219/69.12 |
| 4,341,939 A * | 7/1982 | Briffod et al. | ............. | 219/69.12 |
| 4,935,594 A * | 6/1990 | Groos et al. | ............. | 219/69.12 |
| 4,977,303 A * | 12/1990 | Briffod | ............. | 219/69.12 |
| 5,741,376 A * | 4/1998 | Subramanian et al. | ....... | 148/422 |
| 5,945,010 A * | 8/1999 | Tomalin | ............. | 219/69.12 |
| 6,306,523 B1 * | 10/2001 | Seong | ............. | 428/613 |
| 6,447,930 B2 * | 9/2002 | Barthel et al. | ............. | 428/674 |
| 6,781,081 B2 * | 8/2004 | Groos et al. | ............. | 219/69.12 |
| 2002/0092831 A1 * | 7/2002 | Seong | ............. | 219/69.12 |
| 2003/0057189 A1 | 3/2003 | Groos et al. | | |
| 2004/0234411 A1 * | 11/2004 | Hofmann et al. | ............. | 420/473 |

FOREIGN PATENT DOCUMENTS

| | | | |
|---|---|---|---|
| EP | 0 733 431 | | 9/1996 |
| EP | 0 930 131 | | 7/1999 |
| JP | 2002-126949 A | * | 5/2002 |
| JP | 2002 126950 | | 9/2002 |

OTHER PUBLICATIONS

Machien translation of Japan Patent document 2002-126,949-A, Nov. 2012.*
International Search; PCT/FR2006/000304; Completed May 10, 2006; Mailed May 18, 2006.

* cited by examiner

*Primary Examiner* — Geoffrey S Evans
(74) *Attorney, Agent, or Firm* — RatnerPrestia

(57) ABSTRACT

The invention relates to a wire (1) which comprises a copper or pinchbeck core (2) surrounded by a pinchbeck coating consisting of a continuous pinchbeck sub-layer (3) in phase β and a superficial layer (4) with a fractured pinchbeck structure in phase ? enabling the appearance of pinchbeck in phase β in the fractures (5a). In this way, the electrical discharge machining speed is essentially increased.

21 Claims, 2 Drawing Sheets

COMPOSITE WIRE FOR ELECTRICAL DISCHARGE MACHINING

TECHNICAL FIELD OF THE INVENTION

The present invention relates to electrode wires used for cutting metals or electrically conducting materials by electrical discharge machining (EDM) in an EDM machine.

Most modern EDM machines are designed to use bare brass wires, generally 0.25 mm in diameter, with an ultimate tensile strength ranging between 400 and 1000 N/mm$^2$.

EDM wires need to be electrically conductive. They work by erosive electrical discharge between the wire and a conductive workpiece, in a controlled water-based dielectric medium.

In order to achieve precision machining, in particular in order to be able to cut corners with a small radius, it is necessary to use small-diameter wires of high ultimate tensile strength so that they can be kept taut in the machining region and limit the amplitude of vibrations. One might therefore be tempted to use a wire of which at least a central portion was made of steel, in order to increase the ultimate tensile strength.

As electrical discharge machining is a relatively slow process, there is, at the same time, a need to maximize the machining rate, particularly the roughing machining rate. In this patent application, the roughing machining rate is measured in mm$^2$/min, that is to say in terms of the rate of enlargement of a cut surface area, or in mm/min for a given height of workpiece, that is to say in terms of the rate at which the wire penetrates the workpiece. It will be understood that this rate is directly dependent on the discharge energy released in the machining region between the wire and the workpiece, and is therefore dependent on the electrical energy that the wire can conduct into the machining region. However, erosive discharges in the machining region and the Joule heating produced by the electric current passing through the wire have a tendency to heat the wire.

One of the limits on wires for use for electrical discharge machining is that they break under the combined effect of the heating and the mechanical tension. This forces users to restrict the machining power of their EDM machines, particularly when the wire is not cooled particularly well, for example during conical machining, or when machining very tall workpieces.

The simplest way to avoid breakages is to use large-diameter wires, for example wires having a diameter of 0.30 mm and above. However, that limits the minimum radius of the re-entrant angles that can be machined.

The use of zinc-coated wires has already been proposed, the effect of the coating being to increase the machining rate by comparison with that of a bare brass wire. However, the layer of pure zinc very quickly becomes worn and does not protect the core of the wire for long enough to cut tall workpieces.

It has been proposed for the core of a wire to be covered with a layer of β-brass, that is to say a brass containing approximately 47% zinc, avoiding the disadvantage of excessively rapid wear of a surface layer made of pure zinc. The cutting performance can thus be enhanced.

Document U.S. Pat. No. 4,977,303 describes, on the one hand, a process for producing an electrode wire and, on the other hand, describes an electrode wire with a specific structure.

The process described and claimed in that document consists in providing a metal core, for example made of copper, in covering it with a layer of given thickness (13 to 15 μm) of a volatile metal such as zinc, in heating the whole in an oxidizing atmosphere to above 700° C., preferably to above 850° C., in order to diffuse the zinc and the copper until a diffused layer is obtained that has a thickness of about three times the given thickness of the initial layer of zinc, and reducing the thickness of the diffused layer by at least 30%. The operating conditions for the process described of necessity lead, in the diffused layer, to a zinc concentration of about 33%, that is to say to an α-copper/zinc alloy about 22 μm thick once the thickness has been reduced by 30%.

The electrode wire described and claimed in that document comprises a surface layer of oxide about 1 μm thick, covering a continuous layer about 6 μm thick of copper/zinc alloy containing 58 to 60% zinc (that is to say a γ-copper/zinc alloy), the zinc concentration then decreasing towards the core, to a depth of about 11 μm. The document does not describe how to obtain such an electrode wire with a γ-copper/zinc alloy layer.

Document U.S. Pat. No. 5,945,010 more recently has proposed to anneal a zinc-plated α-brass in such a way as to produce a γ-brass peripheral layer, then to wire-draw the blank thus obtained in order to bring it to the final diameter. The wire-drawing operation produces a fractured γ-brass surface layer. The document mentions that the fracturing of the surface layer does not detract from the cutting rate performance. Further, the document discourages the provision of a β-brass layer.

Finally, document U.S. Pat. No. 6,781,081 (or US 2003/0057189 A1) discloses the good performance of a wire having, on a metal core, a superposition of two continuous layers of brass, the underlayer being made of β-brass, the continuous outer layer being made of γ-brass. The rate of EDM is thus higher than that of wires having just a γ-brass layer or just a β-brass layer. However, the document does not describe how to produce such a wire.

SUMMARY OF THE INVENTION

There is still a need to machine as quickly as possible for a given machining current, and also to be able to use the highest possible machining current for a given diameter of wire.

The present invention is the result of the surprising observation that, with an EDM wire having a metal core covered with a layer of alloy, appreciably enhanced EDM performance can still be obtained by providing, on a core made of copper or brass, a coating layer that combines a fractured γ-brass surface layer and a β-brass sublayer. This observation flies in the face of the teaching of document U.S. Pat. No. 5,945,010 which observes no improvement in cutting rate when using a fractured γ-brass surface layer and which in particular discourages the use of β-brass.

Thus, in order to further improve the EDM machining rate, the present invention proposes an electrode wire for electrical discharge machining, comprising:
 a core made of copper, copper alloy or brass,
 a brass coating,
in which the brass coating comprises the superposition:
 of a β-brass sublayer, and
 of a surface layer with a fractured γ-brass structure which reveals β-brass in the fractures.

According to an advantageous embodiment, β-brass at least partially fills the fractures in the γ-brass surface layer.

The β-brass sublayer may advantageously be continuous, affording better results than a discontinuous sublayer.

Better results, combining both a higher EDM rate and a good surface finish of the machined workpiece, are obtained by giving the fractured γ-brass surface layer a thickness of less than 8% of the diameter of the wire, preferably less than 5% of the diameter of the wire. Upwards of a thickness of about 5%, degradation in the surface finish of the machined workpiece is observed: the finished machined workpiece is found to have striations parallel to the direction of the electrode wire that has done the machining.

As an alternative or as a supplement, the β-brass sublayer may advantageously have a thickness ranging between 5% and 12% of the diameter of the wire.

Industrial-scale production of such an electrode wire is made easier when the combined thickness of the fractured γ-brass surface layer and of the β-brass sublayer is less than about 10% of the diameter of the electrode wire. Beyond this value, there are risks that the wire will break during manufacture in the wire-drawing steps.

One advantageous embodiment is to provide a fractured γ-brass surface layer which has a thickness of about 2% of the diameter of the wire, and a β-brass sublayer which has a thickness of about 6% of the diameter of the wire.

An increase in the EDM rate is also obtained if the external surface of the γ-brass surface layer is sufficiently oxidized, of dark color.

The disadvantage, in certain EDM machines, is that the oxide may give rise to difficulties of electrical contact, or alternatively to the premature wear of the current conductors. It may thus be preferable to have an external surface of the γ-brass surface layer that is less oxidized and still for example has a bright appearance, able to reflect light, so as to be compatible with EDM machines that use this property to detect the presence of the wire.

In practice, in order to avoid electrical contact and current lead wear problems while at the same time guaranteeing enhanced EDM performance, it may be preferable to have an electrode wire in which the average thickness of the oxide layer, measured by selective dissolution, ranges between about 100 nm and about 250 nm, and is preferably less than 200 nm. The oxide layer essentially consists of zinc oxide.

It may be advantageous to choose a core made of brass with a zinc content of less than 40%, more advantageously a core made of brass containing 20% zinc.

As an alternative, it is possible to choose a core made of copper, in order to optimize the conductivity of the wire.

An increase in the EDM rate may also be obtained by choosing a core made of CuZn37 alloy, containing 37% zinc, this having the additional advantage of reducing production costs.

Manufacturing such an electrode wire, it may prove advantageous to apply the low-temperature diffusion to batches of several reels of wire, because in that way there is an energy saving by comparison with a higher-temperature and/or in-line treatment.

Thus, according to another aspect, the invention proposes an economical process for producing such an electrode wire, involving the following steps:

a) providing a core made of copper or of brass, b) covering the core with a layer of zinc using an electrolytic process in order to produce a preblank, c) possibly subjecting the preblank to a first wire-drawing operation, in order to smooth the surface of the zinc-plated wire and thus make the wire easier to pay out once diffusion has taken place, d) annealing the wire-drawn preblank in an oven at a temperature ranging between about 200° C. and about 400° C. and for a time of 2 h to about 40 h, choosing the temperature and the time so as to produce, as a result of diffusion between the zinc of the covering layer and the copper or brass of the core, a blank that has a β-brass sublayer and a γ-brass surface layer, itself being at least slightly oxidized at the surface, e) subjecting the blank thus diffused to a second, cold, wire-drawing operation in order to bring it to its final diameter and in such a way as to fracture the γ-brass surface layer.

However, such an electrode wire may be manufactured by a batch heat treatment at a lower temperature and for a longer length of time, provided that the duration conditions remain compatible with the industrial requirements. Conversely, such an electrode wire may be manufactured using an in-line process, by heating the wire to a higher temperature (about 600° C.) as it is paid out.

During the second wire-drawing operation, the external γ phase first of all fractures into blocks uniformly distributed at the surface of the wire. Between these blocks, there are empty cracks. Next, still during the wire-drawing operation, these blocks tend to group together in the longitudinal direction, allowing the β-phase sublayer to penetrate between them, in order ultimately to lie flush with the surface of the wire at certain points.

For preference, the second wire-drawing operation achieves a diameter reduction ranging between about 40% and about 78%. That allows the peripheral layer of γ-brass to be fractured correctly.

In addition, a decision may be made to perform the first wire-drawing operation achieving a diameter reduction ranging between about 40% and about 60%.

In the process, the annealing step d) may advantageously be performed in a furnace at a temperature and for a time that are chosen in such a way that the average thickness of the oxide layer, measured by selective dissolution on the electrode wire after step e), ranges between about 100 nm and about 250 nm.

It is not possible simply to list all the time and temperature conditions that would yield a certain state of diffusion. This is because the diffusion performed in order to manufacture an electrical discharge machining wire relates to an external layer of zinc that is neither planar nor thin nor thick enough to constitute a semi-infinite medium. In addition, the potential thermal paths (temperature varying as a function of time) are very diverse.

In the case of diffusion operations performed in air on copper or zinc-plated CuZn20 brass wires packaged in 4 kg reels, it has been found that the thickness e of the intermediate layer of β-phase increased as a function of time t according to the following law: $de/dt=D/e$, D being a diffusion coefficient dependent on the temperature T and on the composition of the core of the wire, $de/dt$ being the derivative of the thickness e with respect to time t. The coefficient D is a function of the temperature T according to a law of the type $D=D_o e^{-Q/RT}$, $D_0$ being a frequency factor expressed in $m^2/s$, Q being an activation energy expressed in J/mol, R being the molar gas constant for perfect gases and being equal to 8.31 J/(mol.K), and T being the temperature expressed in Kelvin.

$D_0$ and Q depend on the nature of the core of the zinc-coated wire. For temperature ranges from about 620° K. to about 680° K., it is possible to choose $D_0=4.98\times10^{-4}$ and $Q=129\,500$ for a copper core, $D_0=2.46\times10^{-6}$ and $Q=100\,800$ for a CuZn20 brass core.

For a CuZn37 core, it is possible to choose $D_0=4.10\times10^{-3}$ and $Q=138\,200$.

The differential equation $de/dt=D/e$ can be integrated using any known method. At constant temperature, integration yields the simplified formula $e=(2D.t)^{1/2}$. The final β-phase thickness is of course limited by the amount of zinc available and, according to the invention, provision is made to leave a little γ-phase at the surface.

For diffusion operations on wires packaged in larger reels, the treatment time is advantageously lengthened by lowering the soak temperature in order to ensure an even temperature throughout the mass of the reels.

Thus, the inventors have been able to obtain some β-phase between the α-phase of the core and the external γ-phase layer, as follows: taking a wire comprising a brass core containing 63% copper and 37% zinc and a 3 μm coating of pure zinc, the outside diameter of which is 0.46 mm; heat treating this wire for 15 hours at 220° C. This then yields a β-phase sublayer approximately 2 μm thick between the α-brass core and a γ-phase external layer about 4 μm thick.

The information given hereinabove allows the person skilled in the art to make his choice of time and temperature conditions—in fact, to choose his thermal path—according to the initial conditions and according to the desired final conditions.

The fact that diffusion occurs on a wire exposed to oxygen is very important because where this is not the case, in an inert gas atmosphere or under reduced pressure, there would be a significant evaporation of the zinc, and the β-phase thickness remaining at the end of diffusion would be far lower.

If there is a desire to strongly oxidize the external surface of the γ-brass surface layer, the annealing is performed in air. The air needs to be able to diffuse to the surface of the wire more quickly than oxidation thereof requires. To achieve that, a preblank in the form of a not very dense winding is provided, for example in a basket, or, alternatively, a very shallow temperature gradient, less than 0.5° C./min, for example 0.2° C./min, is used to raise the temperature. If the winding is dense, it will chiefly be the outside of the reel that will oxidize while the inside remains out of contact with the oxygen.

If very little external surface oxidation of the γ-brass surface layer is desired, the air present between the strands of wire will be used by itself. To do that, the reel will be enclosed in a sealed or semi-sealed device, such as a thin metal foil, for example an aluminum foil, wrapped around it. The wrapping device must allow the gases contained in the wrapper around and within the reel to expand and contract during the heat treatment. Oxidation is thus limited by wrapping the preblank in a sealed or semi-sealed wrapper.

The temperature and time conditions for the diffusion heating step are preferably chosen so that the average thickness of the oxide layer, measured by selective dissolution on the electrode wire after step e), ranges between about 100 nm and about 250 nm.

The selective dissolution solution may be as follows: 50 ml of one-molar acetic acid in 200 ml of water, to which 0.5 ml of propargyl alcohol is added. The immersion time is about 2 minutes. The weight loss M of a length L of wire of diameter $D_1$ is measured. It is assumed that this weight loss M is due to dissolution of the zinc oxide, the density $M_v$ of which is about 5 600 kg/m³, such that the thickness of the oxide $E_0$ can be deduced using the formula $E_0 = M/\pi D_1 L M_v$.

Diffusion in an inert atmosphere or under reduced pressure is not to be recommended because the zinc will then partially evaporate from the surface of the wire and form powders. Such metal powders, which are highly reactive, are undesirable and this is why diffusion in air is recommended.

BRIEF DESCRIPTION OF THE DRAWINGS

Other objects, features and advantages of the present invention will emerge from the following description of particular embodiments given with reference to the attached figures among which.

DESCRIPTION OF THE PREFERRED EMBODIMENTS

In the embodiments illustrated in the figures, an electrode wire 1 for EDM machining comprises a core 2 made of copper or brass, coated with a coating consisting of a continuous β-brass sublayer 3 and of a surface layer 4 with a fractured γ-brass structure which reveals β-brass in the fractures.

In this description and in the claims, the expression "β-brass" is used to denote an alloy of copper and of zinc containing more or less 45% to 49% zinc. At ambient temperature, this β phase is ordered and somewhat brittle and is customarily termed the β' phase. If a certain temperature is exceeded, the structure becomes disordered and is then said to be a β phase. The transition between the β and β' phases is inevitable, but has little effects. In consequence, for simplicity, this brass will in the present description be denoted by the single expression "β-brass".

In the description and in the claims, the expression "γ-brass" is used to denote an alloy of copper and zinc in which zinc is present in a proportion of about 65%.

An "γ-brass" may have a zinc content of less than 40%, for example of about 35% or even of about 20%.

Figure 3:
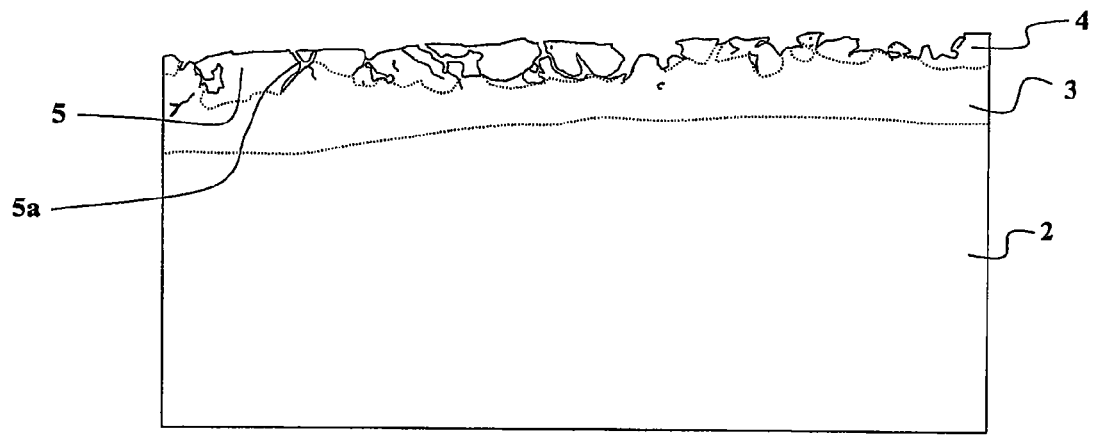
FIG. 3 is a longitudinal section through an EDM wire according to one embodiment of the invention, with a brass core.
Figure 4:
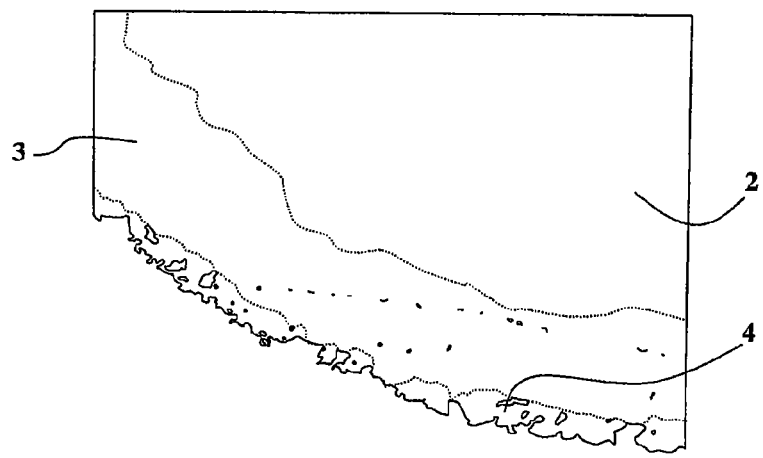
FIG. 4 is a cross section through an EDM wire according to the invention, with a copper core.

As far as the surface layer 4 is concerned, a γ-phase region 5, bordered by fractures 5a in which β-brass may appear can be distinguished, for example (FIG. 3).

β-brass may at least partially fill the fractures 5a in the γ-brass surface layer 4, giving the surface of the wire a certain degree of continuity.

The advantageous effect of such a wire structure has been demonstrated through several trials carried out on wires of different structures.

Trial No. 1

This first trial demonstrates that a fractured γ-brass surface layer reduces the maximum strength of the electric current that the wire can withstand.

For this, several wires with the same diameter $D_1$ of 0.25 mm were provided. The wire was fixed between two electrical terminals immersed in deionized water at 20° C. The wire was subjected to no mechanical tension. An electric current generator was connected to the terminals of the device. The electric current was increased until the wire broke, and the maximum current strength tolerated by the wire was noted.

The results feature in the table below.

| Wire | Maximum current strength withstood |
|---|---|
| Copper | 130 A |
| CuZn 37 brass | 75 A |
| CuZn 37 brass coated with 3 μm of pure zinc | 75 A |
| CuZn 37 brass coated with 3 μm of pure zinc then diffused in the γ phase, non-fractured | 75 A |

-continued

| Wire | Maximum current strength withstood |
|---|---|
| CuZn 37 brass coated with zinc, diffused at 177° C. then drawn to obtain a fractured γ phase | 65 A |

It should be noted that the final wire tested, with a fractured γ-phase on a brass core, is in accordance with the teaching of the aforementioned document U.S. Pat. No. 5,945,010.

Trial No. 2

A wire A according to the invention, with a diameter $D_1$ of 0.25 mm, consisting of a core 2 made of CuZn20 brass covered by an apparently non-fractured β-phase sublayer 3 and by a visibly fractured γ-phase surface layer 4 was then produced. To do so, a CuZn20 brass wire with a diameter of 1.20 mm was coated with 29 μm of zinc using an electrolytic process. This wire was drawn down to a diameter of 0.827 mm. The wire was annealed by passing it through a furnace for two hours at 400° C., with temperature rise and fall gradients of ±1° C./min, and in an air atmosphere. Finally, the wire thus diffused underwent a wire-drawing operation to bring it down to a diameter $D_1$ of 0.25 mm. The layer of coating obtained on the wire measured approximately 20 μm thick in total. It was made up of a β-phase sublayer 3 visible at the surface of the wire at certain points and covered at other points with a fractured γ-brass 4. It was thus apparent that, during the wire-drawing step, the β-brass sublayer 3 did not crack of its own accord during the wire-drawing operation.

This wire, tested under the same conditions as the preceding wires in trial No. 1, withstood a maximum current of 75 A. Its ultimate tensile strength was 750 N/mm². It could be successfully used in EDM machining under a mechanical tension of 17 N.

This trial revealed a surprising effect in the β-brass sublayer 3 which enhanced the ability of the wire to withstand a high electric current and brought this ability into line with that of wires in which the surface layer 4 is not fractured.

Trial No. 3

A wire B was then produced as follows : a CuZn20 brass core 1.20 mm in diameter was coated with 29 μm of zinc, then underwent a wire-drawing operation to reduce it to a diameter $D_1$ of 0.25 mm. An annealing operation lasting 1 h 15 at 380° C. was performed in order to obtain a wire comprising a β-phase sublayer 3 about 16 μm thick and a γ-phase surface layer 4 about 4 μm thick that was substantially not fractured (because it had not undergone a wire-drawing operation).

This wire withstood a maximum current of 75 A. It exhibited an ultimate tensile strength of 430 N/mm² and could successfully be used in EDM machining, although with a mechanical tension reduced to 10 N.

Thus, the wire A according to the invention, produced during trial No. 2, exhibited better mechanical strength than the wire B of the trial above.

Trial No. 4

The EDM rates of wires A and B were then compared, under conditions suited to the two wires, that is to say with a mechanical tension of 10 N.

The trial was performed using an AgieCut Evolution II SFF machine produced by Agie.

The conditions were as follows: basic technology estccca25nnn300g230050, suited to zinc-plated brass wires with a strength of 900 N/mm², nozzles pressed against the workpiece. The material being machined was steel 60 mm tall. The mechanical tension in the wire was lowered to 10 N. The EDM rate was 2.515 mm/min for wire A, 2.500 mm/min for wire B. A slight increase in the EDM rate was therefore observed for wire A.

Using the same machine, the same material and the technology estccw25nnn300h250050, suited to wires with a CuZn20 brass core and a β-phase layer, in the annealed state, the force on the wire was 12 N and the following maximum rates were observed, gradually increasing the value of the parameter P from 1 until the wire broke: 2.79 mm/min for wire A (with P=27); 1.85 mm/min for wire B (with P=19).

The fact that wire A machined more quickly than wire B is in sharp contrast with the data published in document U.S. Pat. No. 5,945,010.

Trial No. 5

The influence of the thickness $E_4$ of the fractured γ-phase was then sought so as to discover a wire with an optimum EDM rate.

A wire according to the invention was obtained from a copper core 0.9 mm in diameter. The core was coated with zinc, then underwent a wire-drawing operation in order to obtain an intermediate wire 0.422 mm in diameter in which the external layer of zinc was 16 to 19 μm thick. The intermediate wire was raised to various temperatures, for various times, so as to produce external layers composed of β and γ phases in different proportions. After the diffusion treatments, the wires were in the annealed state. A cold wire-drawing operation yielded EDM wires with a diameter $D_1$ of 0.25 mm in the work-hardened state. The γ-phase surface layer 4 was fractured, while the β-phase sublayer 3 remained continuous. The γ-phase surface layer 4 did not cover all of the surface of the wires, and the thickness $E_4$ of this γ-phase surface layer 4 was noted, where such a layer was present, which gave not an average thickness value but rather a maximum value.

The results are collated in the table below.

| Wire | Diffusion conditions | Layer thicknesses (maximum thickness if γ layer present) | Maximum EDM rate in E2 H50 regime | Premature breakage during machining |
|---|---|---|---|---|
| 1 | 400° C., 2 h, ±0.5° C./min in air | β 25 μm γ 2 μm dark appearance | 4.35 mm/min | No |
| 2 | 380° C., 3 h, ±0.5° C./min in air | β 18 μm γ 5 μm dark appearance | 4.76 mm/min | No |
| 3 | 380° C., 3 h, ±0.5° C./min wire sheltered from the air outside the reel | β 18 μm γ 5 μm bright appearance | 4.61 mm/min | No |
| 4 | 360° C., 2 h, ±0.5° C./min in air | β 5 μm γ 20 μm non-uniform color appearance | 4.05 mm/min | Yes |
| 5 | 320° C., 2 h, ±0.5° C./min in air | β 5 μm γ 20 μm non-uniform color appearance | 3.7 mm/min | Yes |

It was found that a fractured γ-phase surface layer 4 of excessive thickness $E_4$ led to premature breakages of the wire during machining.

From the above trials it can be deduced that the fractured γ-brass surface layer 4 preferably has a thickness $E_4$ of less than 8% of the diameter of the wire, more advantageously of the order of 2% of the diameter of the wire.

For its part, the continuous β-brass sublayer 3 may advantageously have a thickness $E_3$ ranging between 5% and 12% of the diameter of the wire, more advantageously close to 6%.

A good compromise was obtained by providing a fractured γ-brass surface layer 4 with a thickness $E_4$, where such a layer was present, of about 6 μm for a wire diameter of 250 μm (namely representing slightly more than 2% of the diameter) and a continuous β-brass sublayer 3 with a thickness $E_3$ of about 15 μm, namely of about 6% of the diameter of the wire.

Figure 1:
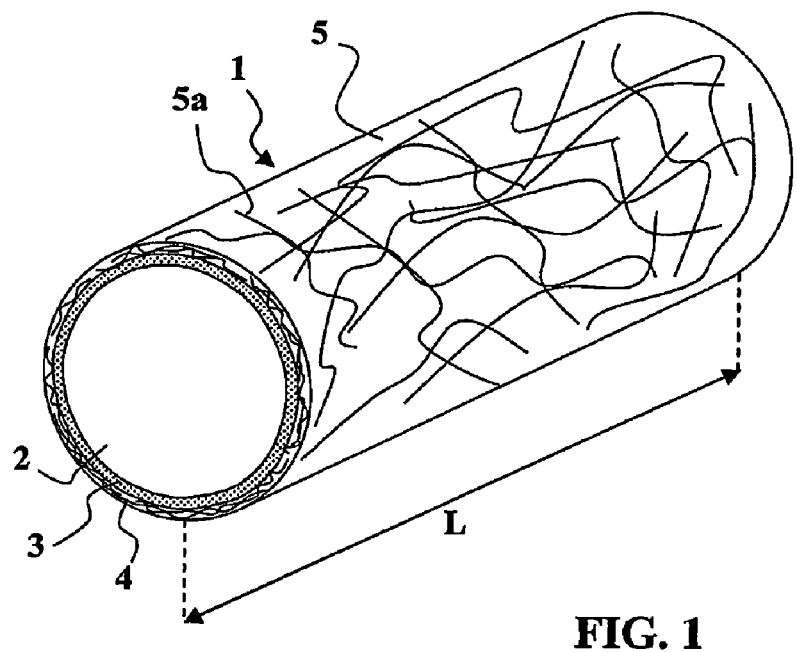
FIG. 1 is a schematic perspective view of an EDM wire according to one embodiment of the present invention.
Figure 2:
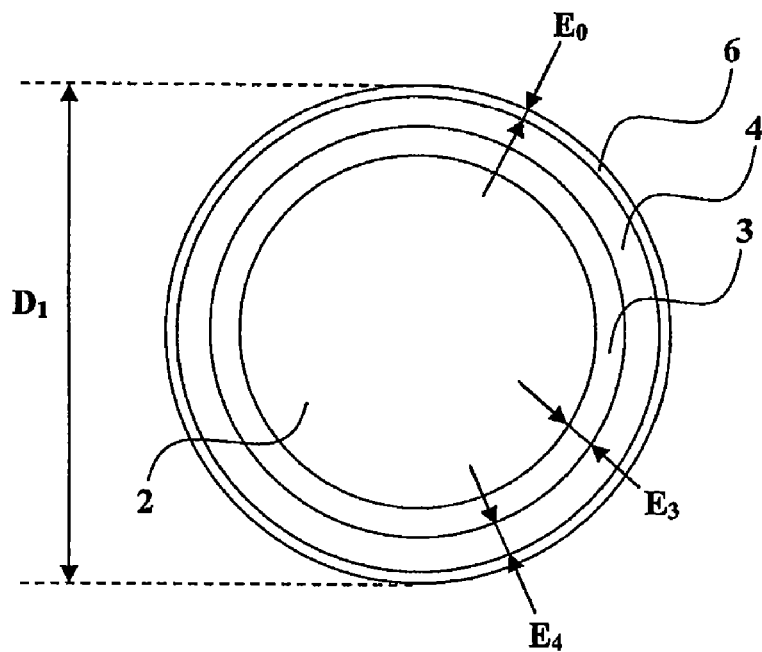
FIG. 2 is a schematic cross section, on a larger scale, of the EDM wire of FIG. 1.

The wires 2 and 3 in the table above show that the EDM rate is further enhanced in the presence of oxidation of the external surface of the γ-brass surface layer 4. FIG. 2 illustrates the presence of an oxide layer 6 of average thickness $E_O$.

One unexpected effect of the fractured γ-brass surface layer 4, even when present in a very small amount at the surface of a diffused wire, was better electrical touch by comparison with a completely diffused β-phase wire with surface oxidation. The electrical touch consists, on an Agie Evolution II machine, in very low powered sparking, simply allowing the workpiece to be located precisely, rather than cut.

Lesser soiling of the current conducting contacts was also found with wires that had a fractured γ-phase surface layer 4 and a β-phase sublayer 3, by comparison with wires diffused to the extent that the γ phase disappeared completely. It might be thought that the fractured γ phase, even when present in small quantities, allows the current conductors to be cleaned. Any oxide and lubricant residues deposited on the surface of the current conductors could be removed through the wire surface scraping effect, which surface is uneven.

Trial No. 6

The possibility of producing a wire according to the invention having a CuZn37 brass core (63% copper and 37% zinc) with a view to producing a wire for a lower cost but which nonetheless exhibited the advantages of the invention was then researched.

A satisfactory wire was obtained by choosing a relatively long diffusion treatment at a relatively high temperature so as to produce a β-brass sublayer 3 and a fractured γ-phase surface layer 4.

To do that, a CuZn37 brass blank was coated with 9 μm of zinc on a diameter of 0.827 mm, then treated in a furnace, in air, with a temperature rise gradient from ambient temperature to 320° C. of +0.5° C./min, a soak lasting 11 h at 320° C., a temperature lowering gradient from 320° C. to ambient temperature of −0.5° C./min. Thereafter, a wire-drawing operation reduced the diameter D1 to 0.25 mm and the wire underwent continuous in-line relaxation annealing prior to winding.

In order to compare the effects obtained according to the invention, test specimens of wires were produced according to the process described in document U.S. Pat. No. 5,945,010:

taking a CuZn37 brass blank (63% copper and 37% zinc);
producing a zinc coating 6 μm thick on a diameter of 0.9 mm ;
carrying out a heat treatment in a furnace at 177° C., in air, to convert the zinc by diffusion into a γ-brass without forming appreciable amounts of β phase;
wire-drawing to 0.25 mm, and carrying out continuous relaxation annealing prior to winding.

By comparison with a conventional bare brass EDM wire, this wire according to document U.S. Pat. No. 5,945,010 had advantages at lower machining power, but it was found that these advantages disappeared when the EDM machining power was increased.

An additional trial was to increase the average thickness of the fractured γ-brass surface layer 4 by increasing the thickness of the zinc coating. However, the wire obtained proved to be brittle, and could not be used in EDM machines which bend the wire during autothreading.

The maximum EDM rates of the wire with a core 2 made of CuZn37 brass and a fractured γ-brass surface layer 4 according to document U.S. Pat. No. 5,945,010 and of the wire according to the invention having a core 2 made of CuZn37 brass with a β-brass sublayer 3 and a fractured γ-brass surface layer 4 were then compared under the same operating conditions:

| Wire | CuZn37 + fractured γ layer | CuZn37 + β layer + fractured γ layer |
|---|---|---|
| EDM rate | 119 mm²/min | 120.5 mm²/min |

With the β-brass intermediate sublayer 3 present, the wire proved to be less brittle in bending. Thus, the total thickness of the wearing layer of the wire could be increased.

The maximum EDM rate for the wire with a core made of CuZn37 brass was improved, and no premature wire breakage was observed.

The present invention is not restricted to the embodiments explicitly described but includes assorted variants and generalizations thereof that fall within the scope of the claims that follow.

The invention claimed is:

1. Electrode wire for electrical discharge machining, comprising:
   a core made of copper, copper alloy or brass,
   a brass coating,
   wherein the brass coating comprises the superposition:
   of a β-brass sublayer, and
   of a surface layer with a fractured γ-brass structure which reveals β-brass in the fractures.

2. Electrode wire according to claim 1, wherein β-brass at least partially fills the fractures in the γ-brass surface layer.

3. Electrode wire according to claim 1, wherein the β-brass sublayer is continuous.

4. Electrode wire according to claim 1, wherein the fractured γ-brass surface layer has a thickness less than 8% of the diameter of the wire, preferably less than 5% of the diameter of the wire.

5. Electrode wire according to claim 1, wherein the external surface of the γ-brass surface layer is oxidized, of dark color.

6. Electrode wire according to claim 1, wherein the external surface of the γ-brass surface layer of the wire is oxidized, but nonetheless has a bright appearance able to reflect light.

7. Electrode wire according to claim 1, wherein the core is made of CuZn37 alloy with a zinc content of about 37%.

8. Electrode wire according to claim 1, wherein the core is made of copper.

9. Electrode wire according to claim 1, having an oxide layer that has an average thickness which, measured by selective dissolution, ranges between about 100 nm and about 250 nm.

10. Electrode wire according to claim 9, wherein the oxide layer essentially consists of zinc oxide.

11. Electrode wire according to claim 1, wherein the core is made of brass with a zinc content of less than 40%.

12. Electrode wire according to claim 11, wherein the core is made of brass containing 20% zinc.

13. Electrode wire according to claim 1, wherein the β-brass sublayer has a thickness ranging between 5% and 12% of the diameter of the wire.

14. Electrode wire according to claim 13, wherein the combined thickness of the fractured γ-brass surface layer and of the β-brass sublayer is less than about 10% of the diameter of the electrode wire.

15. Electrode wire according to claim 14, wherein the fractured γ-brass surface layer has a thickness of about 2% of the diameter of the wire, and the β-brass sublayer has a thickness of about 6% of the diameter of the wire.

16. Process for producing an electrode wire having a core made of copper, copper alloy or brass, and a brass coating, the brass coating comprising the superposition of a β-brass sublayer and of a surface layer with a fractured γ-brass structure which reveals β-brass in the fractures, the method comprising:
   a) providing the core,
   b) covering the core with a layer of zinc using an electrolytic process in order to produce a preblank,
   c) possibly subjecting the preblank to a first wire-drawing operation,
   d) annealing the wire-drawn preblank in a furnace at a temperature ranging between about 200° C. and about 400° C. and for a time of about 2 h to about 40 h, choosing the temperature and the time so as to produce, as a result of diffusion between the zinc of the covering layer and the copper or brass of the core, a blank that has the β-brass sublayer and a surface-oxidized γ-brass surface layer,
   e) subjecting the blank thus diffused to a second, cold, wire-drawing operation in order to bring it to its final diameter and in such a way as to fracture the γ-brass surface layer such that the β-brass sublayer is revealed in the fractures.

17. Process according to claim 16, wherein the second wire-drawing operation achieves a diameter reduction ranging between about 40% and about 78%.

18. Process according to claim 16, wherein the first wire-drawing operation achieves a diameter reduction ranging between about 40% and about 60%.

19. Process according to claim 16, wherein the annealing step d) is performed in a furnace at a temperature and for a time that are chosen in such a way that the average thickness of the oxide layer, measured by selective dissolution on the electrode wire after step e), ranges between about 100 nm and about 250 nm.

20. Process according to claim 16, wherein the annealing step d) is performed in air, producing oxidation of the external surface of the γ-brass surface layer.

21. Process according to claim 16, wherein the annealing step d) is performed while limiting oxidation by wrapping the preblank in a sealed or semi-sealed wrapper.

* * * * *